UNITED STATES PATENT OFFICE 2,147,149

NONCORROSIVE ANTIFREEZE LIQUID

Leo J. Clapsadle, Buffalo, and Alvan H. Tenney, Mount Vernon, N. Y., assignors, by mesne assignments, to Union Carbide and Carbon Corporation, a corporation of New York No Drawing. Application November 9, 1935, Serial No. 48,997. Renewed October 18, 1937

13 Claims. (Cl. 252—5)

The invention relates to new liquid compositions for use in fluid cooling systems, shock absorbers, hydraulic lifts, and the like. It has particular reference to new and useful inhibitors for the prevention of metal corrosion in fluid systems employing an alcohol as an anti-freeze medium.

Alcohols of common usage as a freezing point depressant include methanol, ethanol, propanol, or other mono-hydroxy alcohols, and the polyhydroxy alcohols, such as ethylene glycol, propylene glycol, diethylene glycol, and glycerine. The invention is applicable to compositions containing any of these liquids, and where an alcohol is referred to in the specification and claims, it is intended to include all of the saturated aliphatic hydroxy compounds or mixtures thereof. It is an object of the invention to provide an alcohol heat-transfer or fluid pressure medium, containing small additions of an inhibitor composition, adapted to protect iron, copper, brass, solder, aluminum, and other metals, from corrosive action commonly induced in normal uses of such liquids. A further object is to effectively produce and maintain substantially non-corrosive conditions in a cooling fluid where an alcohol may be employed in full strength, in mixture with other alcohols, or in a diluted solution with water.

We have found that a ternary mixture of an alkali metal nitrite, an alkali metal chromate, and an alkaline component of an organic or inorganic base, each in very small concentrations, will accomplish this objective, and provide corrosion protection for all metals commonly employed in cooling and pressure systems. The inhibitor is universally applicable in function with all of the known alcohol type anti-freeze liquids.

Sodium compounds are especially appropriate for all three constituents, specifically sodium nitrite, sodium chromate, preferably in the decahydrate form, and sodium hydroxide. Triethanolamine, or other hydroxy alkylamine, may be substituted for the sodium hydroxide, as the free alkaline component of the mixture. Only very small additions of each material are necessary to provide a proper inhibiting action. While the most effective concentration may vary with different alcohols, a suitable range, by weight of the alcohol, is from 0.05% to 2.0% of sodium nitrite, 0.02% to 1.0% of sodium chromate, 0.01% to 0.10% of sodium hydroxide, or in place of the latter, 0.05% to 1.0% of triethanolamine. Sodium chromate has a limited solubility in certain alcohols, and in ethyl alcohol it is practically insoluble. With the latter alcohol, and others of low solvent power toward this constituent, it is, therefore, desirable to mix small amounts of methanol or a glycol such as ethylene glycol, diethylene glycol, or propylene glycol, any of which will form an alcohol mixture capable of dissolving sufficient sodium chromate to insure its proper function in the inhibitor mixture.

A specific anti-freeze composition, representative of the invention will consist, for example, of an alcohol mixture of about 95 parts of ethyl alcohol, and 5 parts of a glycol, to which has been added, in percentage by weight, 0.25% of sodium nitrite, 0.05% of sodium chromate (decahydrate), and 0.04% of sodium hydroxide. In this same composition, 0.14% by weight of triethanolamine may be substituted for the sodium hydroxide, and is equally effective in its action.

This three-component inhibitor provides protection not only for iron, but for all other metals commonly used in fluid cooling and pressure systems. It inhibits corrosion to an extent quite impossible with any one of the materials alone, or any binary combination of them. Discoloration of aluminum, a condition difficult to avoid with prior known inhibitors, is also prevented by this mixture, under all normal operating conditions. A clear solution is obtained, and the inhibitor remains soluble in the alcohol, in its use as an anti-freeze medium, both in full strength and in diluted form. A protective film appears to form on iron in contact with the inhibited alcohol, and this film will prevent atmospheric corrosion of surfaces in a cooling system which may, during operation, become exposed. The inhibitor functions substantially as well on surfaces contaminated with rust as it does on the clean metal, and no foaming is encountered in alcohols containing it.

It will be understood that the invention is applicable in use with all of the common anti-freeze alcohols, where they may be employed both individually and in mixtures of two or more. In an automobile cooling system, the alcohol is usually diluted with water, and in any degree of aqueous dilution the inhibitor is equally effective. Other diluents, such as kerosene, and very small quantities of a dye, both of which are sometimes used in anti-freeze solutions, will not affect the inhibiting action. Modification in the specific proportions given will be evident, and the most suitable inhibitor concentration for any particular alcohol base may be readily determined. While sodium compounds are preferred, similar salts of potassium or other materials, within the class indicated, may be equally effective.

The invention should not be limited other than as defined in the appended claims.

We claim:

1. A non-corrosive anti-freeze liquid comprising an alcohol and an inhibitor consisting of a mixture of an alkali metal nitrite, an alkali metal chromate, and an alkaline component of the group consisting of an alkali metal hydroxide and a hydroxy alkylamine.

2. A non-corrosive anti-freeze liquid comprising an alcohol and an inhibitor consisting of a mixture of an alkali metal nitrite, an alkali metal chromate, and a member of the group consisting of sodium hydroxide and triethanolamine.

3. A non-corrosive anti-freeze liquid comprising an alcohol and an inhibitor consisting of a mixture of about 0.05% to about 2.0% of an alkali metal nitrite, about 0.02% to about 1.0% of an alkali metal chromate, and about 0.01% to about 0.10% of an alkali metal hydroxide.

4. A non-corrosive anti-freeze liquid comprising an alcohol and an inhibitor consisting of a mixture of about 0.05% to about 2.0% of an alkali metal nitrite, about 0.02% to about 1.0% of an alkali metal chromate, and about 0.5% to 1.0% of a hydroxy alkylamine.

5. A non-corrosive anti-freeze liquid comprising an alcohol and an inhibitor consisting of a mixture of about 0.05% to about 2.0% of sodium nitrite, about 0.02% to about 1.0% of sodium chromate, and about 0.01% to 0.10% of sodium hydroxide.

6. A non-corrosive anti-freeze liquid comprising an alcohol and an inhibitor consisting of a mixture of about 0.05% to about 2.0% of sodium nitrite, about 0.02% to about 1.0% of sodium chromate, and 0.05% to about 1.0% of triethanolamine.

7. A non-corrosive anti-freeze liquid comprising an alcohol mixture of about 95 parts ethyl alcohol and 5 parts of a glycol, and an inhibitor consisting of a mixture of about 0.25% sodium nitrite, about 0.05% sodium chromate, and about 0.04% sodium hydroxide.

8. A non-corrosive anti-freeze liquid comprising an alcohol mixture of about 95 parts ethyl alcohol and 5 parts of a glycol, and an inhibitor consisting of a mixture of about 0.25% sodium nitrite, about 0.05% sodium chromate, and about 0.14% triethanolamine.

9. Method of inhibiting corrosion of metals by an alcohol solution in contact therewith, which comprises contacting said solution with metals in the presence of an inhibitor mixture consisting of an alkali metal nitrite, an alkali metal chromate, and an alkaline component of the group consisting of an alkali metal hydroxide and a hydroxy alkylamine.

10. A method of inhibiting corrosion of metals by an alcohol in contact therewith, which comprises contacting said alcohol with metals in the presence of an inhibitor mixture consisting of sodium nitrite, sodium chromate, and a member of the group consisting of sodium hydroxide and triethanolamine.

11. Method of inhibiting corrosion of metals by an alcohol solution in contact therewith, which comprises contacting said alcohol with metals in the presence of about 0.05% to about 2.0% sodium nitrite, about 0.02% to 1.0% sodium chromate, and about 0.01% to 0.10% sodium hydroxide.

12. Method of inhibiting corrosion of metals by an alcohol solution in contact therewith, which comprises contacting said alcohol with metals in the presence of about 0.05% to about 2.0% sodium nitrite, about 0.02% to 1.0% sodium chromate, and 0.05% to about 1.0% of triethanolamine.

13. A non-corrosive anti-freeze liquid comprising an alcohol and an inhibitor consisting of a soluble nitrite salt, an alkali metal chromate, and an alkaline component of the group consisting of an alkali metal hydroxide and a hydroxy alkylamine.

LEO J. CLAPSADLE.
ALVAN H. TENNEY.